(12) United States Patent
Kimura et al.

(10) Patent No.: US 6,273,232 B1
(45) Date of Patent: Aug. 14, 2001

(54) ELECTRIC PARKING LOCK DEVICE

(75) Inventors: Kiyoshi Kimura; Yasuo Kima; Kenichiro Kimura; Shugo Kondo; Toru Namiki, all of Saitama (JP)

(73) Assignee: Honda Giken Kogyo Kabushiki Kaishi, Tokyo (JP)

( * ) Notice: Subject to any disclaimer, the term of this patent is extended or adjusted under 35 U.S.C. 154(b) by 0 days.

(21) Appl. No.: 09/391,240

(22) Filed: Sep. 7, 1999

(30) Foreign Application Priority Data

Sep. 9, 1998 (JP) .................................................. 10-254969

(51) Int. Cl.$^7$ .................................................. B60K 41/26
(52) U.S. Cl. ........................................ 192/219.6; 192/222
(58) Field of Search ............................. 192/219.5, 219.6, 192/222, 220.2; 188/31, 69; 74/411.5, 335

(56) References Cited

U.S. PATENT DOCUMENTS 5,696,679 * 12/1997 Marshall et al. .................. 192/222 X
5,704,457 *  1/1998 Kimura et al. ..................... 192/220.2
5,827,149 * 10/1998 Sponable .......................... 74/411.5 X

FOREIGN PATENT DOCUMENTS 9-216844    8/1996  (JP) .

* cited by examiner

*Primary Examiner*—Rodney H. Bonck
(74) *Attorney, Agent, or Firm*—Armstrong, Westerman, Hattori, McLeland, & Naughton, LLP

(57) ABSTRACT

In an electric parking lock device having a motor for generating a drive force for engagement and release of a parking lock pawl from a parking lock gear in response to a command output from a selector switch. A compression spring if used for applying a force so as to release the parking lock pawl from the parking lock gear. A shift arm is provided on a side which is closer to an input end of the parking lock pawl than to the compression spring, whereby when driving of the parking lock pawl in a lock releasing direction is effected, the motor side and the parking lock pawl side are connected directly, while when driving the parking lock pawl in a lock effecting direction, the compression spring is interposed between the motor side and the parking lock pawl, so that a manual lock release operation can be performed within a range where the compression spring is allowed to be deflected irrespective of the state of the motor.

4 Claims, 4 Drawing Sheets

ELECTRIC PARKING LOCK DEVICE

BACKGROUND OF THE INVENTION

1. Field of the Invention

The present invention relates to an electric parking lock device having a drive force generating means for engagement and/or release of a parking lock pawl with and/or from a parking lock gear in response to a command from a parking command means.

2. Description of the Related Art

With a vehicle in which the power from an engine is transmitted to driving wheels via a torque converter or a vehicle designed to be driven with an electric motor, it is not possible to utilize internal friction of the engine for locking the driving wheels. To cope with this, for instance, Japanese Patent Unexamined Publication No. HEI 8-216844 proposes an electric parking lock device in which a parking lock pawl is provided for engagement with and/or release from a parking lock gear provided on an output shaft of a transmission, and in which the parking lock pawl is operated by an electric actuator so as to lock driving wheels when the vehicle is stopped.

However, it is common with the electric actuator to adopt a construction which does not permit reverse driving through utilization of a screw means for transforming rotational motion of a motor to linear motion or interposition of a speed reducer to make the number of revolutions of an output shaft coincide with the operational angle of a parking lock pawl. Although this obviates the necessity of any special means for retaining he parking lock pawl at a regulated position, it follows that where the motor gets out of operation due to reduction in voltage of a battery or failure of an electrical system while the parking lock pawl is in engagement with the parking lock gear, it becomes difficult to release the parking lock pawl from the parking lock gear. Although the device disclosed in the aforesaid Japanese patent unexamined publication is provided with a manual lock release means, since the release means is constructed such that rotation force is applied to a gear shaft of the speed reducer, the construction becomes very complicated and production cost tends to be increased.

SUMMARY OF THE INVENTION

The present invention was made to solve problems as described above, and a primary object thereof is to provide an electric parking lock device provided with a manual lock release means of a simple construction. In addition, a secondary object of the present invention is to provide an improved electric parking lock device which can securely signal that there occurs a failure of a source of driving force for operation of the parking lock pawl when such really happens and is free from a risk of any failure or malfunction even if the manual lock release means fails to be properly operated.

With a view to attaining the above objects, in the present invention, there is provided an electric parking lock device, including: a drive source generating a drive force for engagement and release of a parking lock pawl with and from a parking lock gear in response to an output from a parking command unit; a spring unit provided along a force transmission path between an output end of the drive source and an input end of the parking lock pawl, for generating a biasing force directed so as to bring the parking lock pawl into engagement with the parking lock gear, the spring unit being maintained without deflecting until the parking lock pawl is at least engaged with the parking lock gear when a force which is directed to bring the parking lock pawl into engagement with the parking lock gear is applied to the parking lock pawl, the spring unit being deflectable by a distance equal to a stroke sufficient for at least releasing the parking lock pawl from the parking lock gear when a force which is directed so as to release the parking lock pawl from the parking lock gear is applied to the parking lock pawl; and a manual lock release unit for applying a force directed to release said parking lock pawl from the parking lock gear at the force transmission path on a side thereof which is closer to the input end of the parking lock pawl than to the spring unit. According to this construction, the driving of the parking lock pawl toward the lock release direction is effected in a state in which the drive source side and the parking lock pawl side are direct connected, and the driving of the same toward the lock execution direction is performed in a state in which the spring unit is interposed between the drive source side and the parking lock pawl side. Thus, if a manual operation force is applied to the parking lock pawl, the parking lock pawl can be displaced within a range in which the spring unit is deflected irrespective of the state of the drive source.

In particular, the electric parking lock device according to the present invention further includes an output side member position detection unit for detecting an output side member interlockingly connected to the output end of the drive source and both displacement limit positions of the outside member, and an input side member position detection unit for detecting an input side member interlockingly connected to the input side of the parking lock pawl and both displacement limit positions of the input side member, wherein the drive source is controlled in response to an output from these two position detection units. According to this construction, since operating conditions on the drive source side and the parking lock pawl side can be detected individually, detection and signaling of a failure and a malfunction can securely be performed, and thus a so-called fail-safe can properly be secured.

DETAILED DESCRIPTION OF THE PREFERRED EMBODIMENTS

Referring to a specific mode for carrying out the present invention illustrated in the accompanying drawings, the present invention will be described in detail below.

Figure 1:
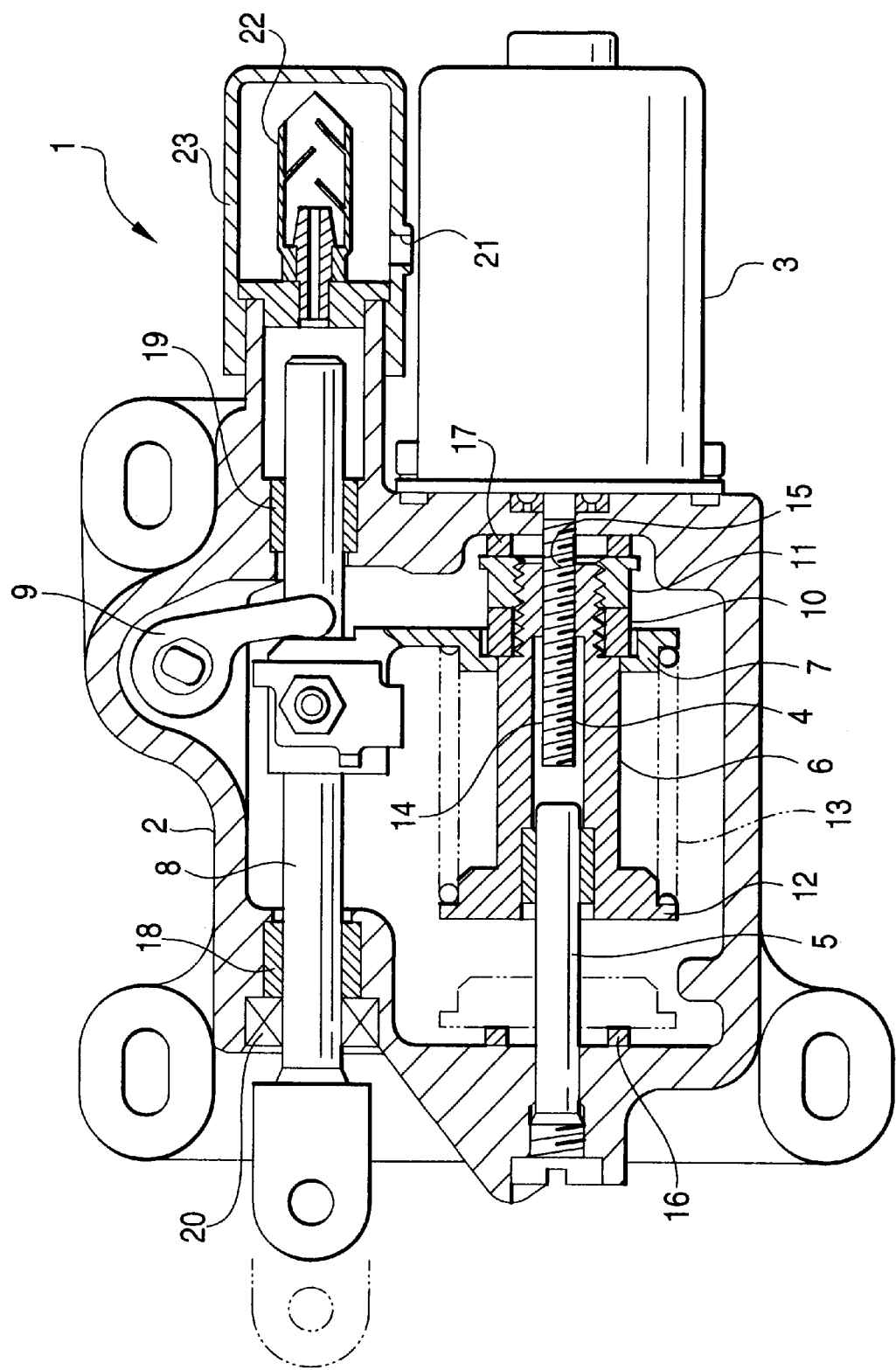
FIG. 1 is a plan view, partially cut away, of an actuator for an electric parking lock device according to the present invention.

FIG. 1 shows an actuator 1 for an electric parking lock device constructed based on the present invention. The actuator 1 includes a motor 3 fixed to a right-hand side wall of a casing 2, a slider 6 screw-connected to an output shaft 4 of the motor 3 and slidably fitted over a guide shaft 5 (fixed to a left-hand side wall of the casing 2 concentrically with the output shaft 4) for transforming the rotation force of the motor 3 into a linear motion, a connecting member 7 connected to the slider 6 at one end thereof in such a manner as not to rotate relative to but to slide together with the slider 6 in axial direction, a rod 8 integrally connected to the other end of the slider 7 and supported on the casing 2 in such a manner as to slide over a shaft which is parallel with a sliding shaft of the slider 6, and a shift arm 9 rotatably supported on the casing 2 in such a manner as to apply to the rod 8 an axial force directed to a parking lock release direction when brought into abutment with the other end of the connecting member 7.

The connecting member 7 is prevented from coming off the slider 6 in a rightward direction as viewed in FIG. 1 via a collar 10 and a nut 11 which are interposed between the one end of the connecting member 7 and the slider 6. In addition, the connecting member 7 is pressed against the collar 10 in a springing-back fashion via compression spring 13 contractedly installed between an externally facing flange 12 formed at a left-hand end of the slider 6 and the connectingmember 7 itself.

Since the slider 6 is prevented from rotating through engagement with the connecting member 7 which is made integral with the rod 8, when the motor 3 is rotated, the slider 6 slides over the guide shaft 5 by virtue of mesh engagement of external threads 14 of the output shaft 4 and internal threads 15 of the slider 6.

Rubber rings 16, 17 are secured, respectively, to inner surfaces of left and right walls of the casing 2 in such a manner as to be brought into abutment with the left end surface of the slider 6 and the right end surface of the nut 11, respectively, whereby risks are eliminated of generation of a rattling sound when the slider 6 reaches its left and right movement extremities and locking of a threaded portion due to impact.

The rod 8 is supported on the housing 2 at ends thereof via slide bushes 18, 19. Fluid tight sealing is provided between the left-hand end of the rod 8 and the housing 2 via a seal member 20. The right-hand end of the rod 8 opens to the atmospheric pressure via a breather chamber 23 having a vent hole 21 formed in a lower wall thereof and a labyrinth passage body 22 provided therein.

Figure 2:
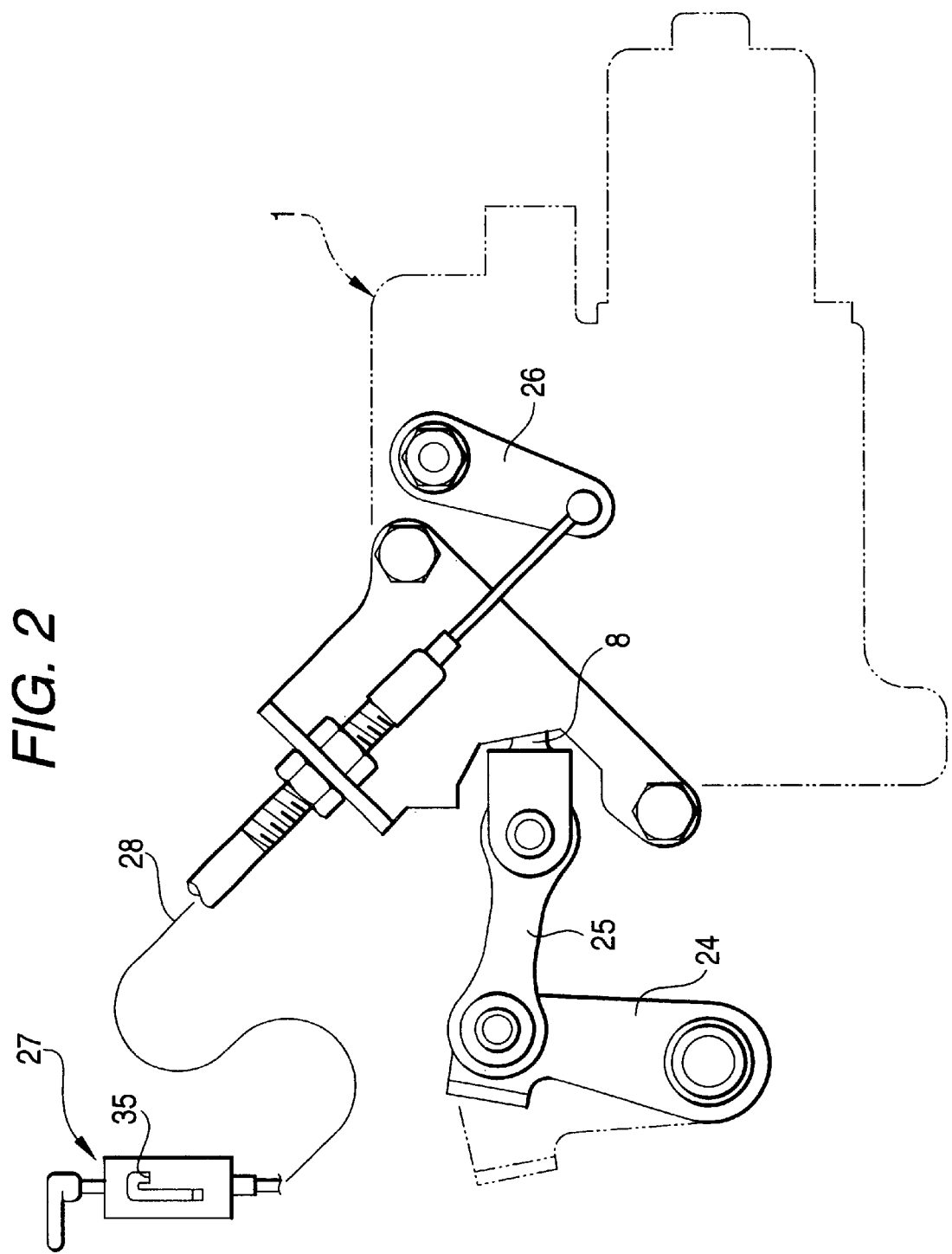
FIG. 2 is a view showing a construction of a manual lock release means.

As shown in FIG. 2, the rod 8 is connected to a free end of a control arm 24 rotatably supported on an external surface of a transmission housing (not shown) via a link 25 at the left-hand end thereof where the rod 8 protrudes out of the housing 2.

A manual operation force transmission arm 26 is secured to a rotating shaft of the shift arm 9 which abuts with the connecting member 7 at a free end thereof. A Bowden cable 28 which is connected at one end thereof to a manual lock release lever 27 provided at a suitable location on a vehicle body, is connected to a free end of the manual operation force transmission arm 26 at the other end thereof.

On the other hand, the control arm 24 is interlockingly connected to a parking lever 29 (refer to FIG. 3) supported on an inner surface of the transmission housing concentrically with the control arm 24.

Figure 3A:
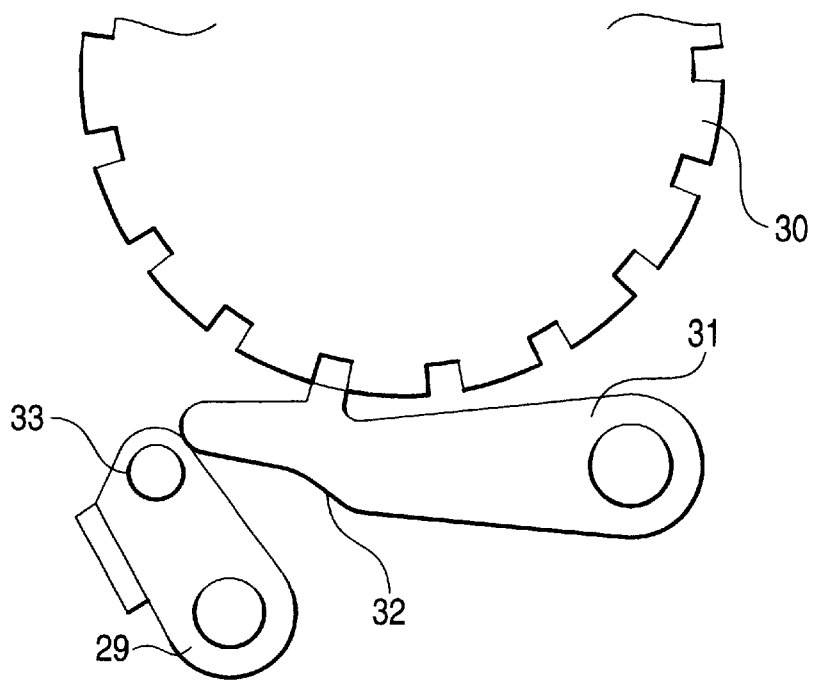
FIGS. 3A and 3B are explanatory views explaining an operation of a parking lock pawl and a parking lock gear, while showing a relationship therebetween.
Figure 3B:
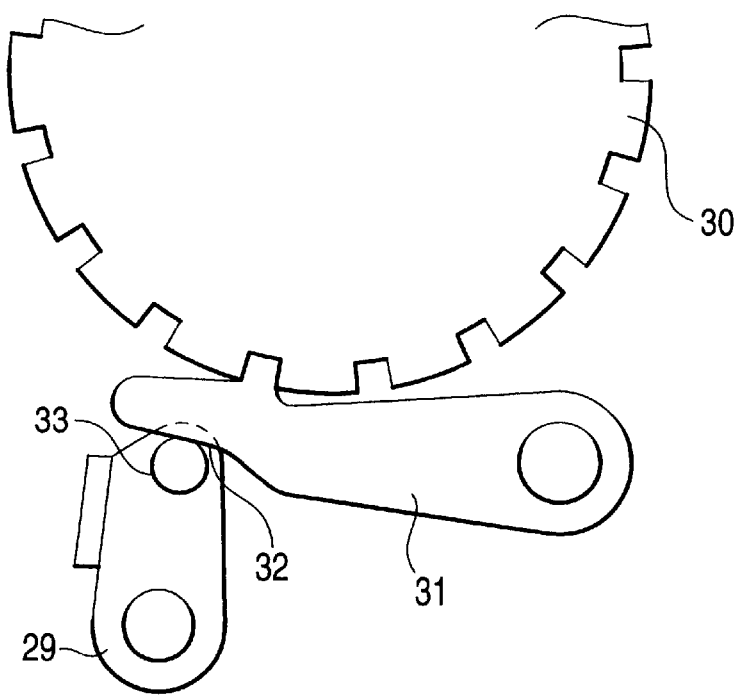

A parking lock gear 30 as shown in FIG. 3 is secured to a suitable position along the power transmission path. A parking lock pawl 31 is pivotally supported in the transmission housing and is provided with a pawl tip adapted to mesh with a tooth of the parking lock gear 30 at a free end thereof. Parking lock is effected through mesh engagement of a tooth of the parking lock gear 30 with the pawl tip of the parking lock pawl 31. In addition, a known lost motion mechanism (not shown) is interposed between the control arm 24 and parking lever 29, whereby any excessive force is designed to be prevented from being applied to the actuator 1 side even in a case where there is caused an interlocking error attributed to a assembly error between the control arm 24 and the parking lever 29, the pawl tip of the parking lock pawl 31 happens to mesh head-on against a top surface of a tooth of the parking lock gear 30, or the parking lock pawl 31 is out of order for some reason.

Formed at the free end of the parking lever 29 is a cam follower 33 adapted to slidably contact a cam surface 32 formed on a side opposed to the side where the pawl tip at the free end of the parking lock pawl 31 resides.

An operation of the electric parking lock device according to the present invention will be described below.

At normal times, when the motor 3 is driven to be rotated, the slider 6 screw-connected to the output shaft 4 is moved in an axial direction by virtue of the rotation of the output shaft 4. For instance, in a state as shown in FIG. 1, when the slider 6 is moved leftward by rotating the motor 3 in one direction, the connecting member 7, which is pressed against the collar 10 integrally connected to the slider 6 by the compression spring 13, is also moved leftward, and then the rod 8 is moved leftward together with the connecting member 7. This movement pushes out the left-hand end of the rod 8, and a counterclockwise rotation force is applied to the control arm 24 connected to the rod 8 via the link 25.

The rotation force of the control arm 24 is then transmitted to the parking lever 29 through a spring-back force of a torsion spring provided on the lost motion mechanism. Then, the cam follower 33 provided at the free end of the parking lever 29 is swung to be rotated and released from the cam surface 32 formed at the free end of the parking lock pawl 31. Here, since the parking lock pawl 31 is rotationally biased counterclockwise by virtue of the spring-back force of the torsion spring (not shown), when the holding force by the cam follower 33 is lost, the pawl tip of the parking lock pawl 31 is disengaged from the tooth of the parking lock gear 30, whereby parking lock is released.

When the motor 3 is rotated in a direction opposed to the direction described above, the slider 6 is moved rightward, and force generated then is applied to the connecting member 7 via the compression spring 13. Here, since the extension force of the compression spring 13 is sufficiently greater than the sliding resistance of the rod 8 and the rotational resistance of the parking lock pawl 31, the connecting member 7 is moved rightward together with the slider 6. In synchronism with this movement, the rod 8 is moved rightward, whereby the control arm 24 is rotated clockwise via the link 25. Then, the cam follower 33 of the parking lever 29 abuts against the cam surface 32 of the parking lock pawl 31, and the pawl tip of the parking lock pawl 31 meshes with the tooth of the parking lock gear 30, whereby a parking lock effected state is realized (a state shown in FIG. 3B).

As with a conventional automatic transmission, the above actuator 1 operates in accordance with the position of a selector lever 34 (refer to FIG. 4) having at least 4 positions such as D: drive; N: neutral; R: reverse; P: parking. In other words, the rod 8 is fully pulled to the right so as to effect parking lock only when the selector lever 34 is set at the position P. Further, with the selector lever 34 set at positions other than P, the rod 8 is pushed fully to the left so as to release the parking lock.

In a case where the motor 3 is out of operation in a parking lock effected state, by pulling the manual lock release lever 27, the manual operation force transmission arm 26 connected to the manual lock release lever 27 via the Bowden cable 28 rotates together with the shift arm 9. Here, since the connecting member 7 is connected to the slider 6 via the compression spring 13, even if the slider 6 remains stationary, the connecting member 7 can be moved irrespective of the state of the slider 6 by an amount in which the compression spring 13 is deflected. Thus, even if the motor 3 is out of operation, the parking lock pawl 31 can be released from the parking lock gear 30 by operating the manual lock release lever 27. Then, this parking lock release position can be held by a gate 35 formed in a holder for the manual lock release lever 27.

Figure 4:
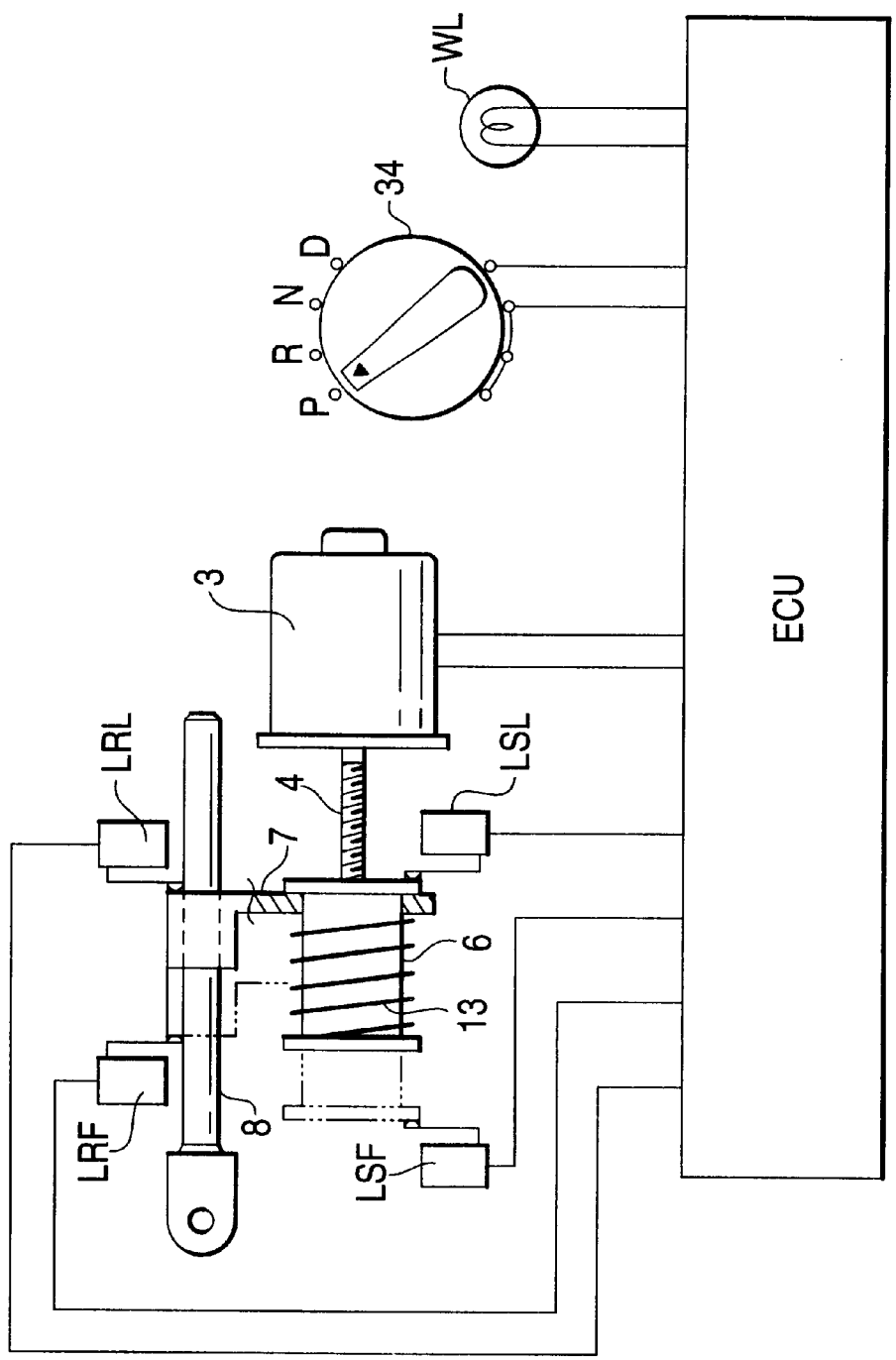
FIG. 4 is a view showing a construction pertaining to detection of an operating condition of the actuator.

As shown in FIG. 4, limit switches LRF, LRL, LSF, LSL are provided for separately detecting left and right or lateral movement limits of the slider 6 and left and right or lateral movement limits of the rod 8. Contact signals of these two sets of limit switches and position signals of the selector switch 34 are inputted into an electronic control unit ECU for comparison, whereby an operating condition is accurately judged, thereby making it possible to regulate the operation of the motor 3 or illuminate a warning lamp WL depending on the results of such comparison.

First, in a state in which every parts are normal with the manual lock release lever 27 not having been pulled, parking lock is effected only when the selector switch 34 is set at the position P, while with the selector switch 34 being set at the other positions, parking lock is released. Thus, if contact opening and closing states of the lateral movement limit detection switches LRF, LRL of the rod 8 and the lateral movement limit detection switches LSF, LSL of the slider 6 are identical and there is no contradiction in the relationship of the states with a position signal from the selector switch 34, it can be judged as normal.

Since there is no case where both of the limit switches LRF, LRL on the rod side are turned on wherever the selector switch 34 may be set, if both are on, it can be assumed that at least one of the two limit switches LRF, LRL fails to operate properly.

If the limit switches LRF, LRL are both turned off with the motor 3 being out of operation wherever the selector switch 34 may be positioned, it can be assumed that the rod 8 is jammed at an intermediate position or that at least one of the two limit switches LRF, LRL fails to operate properly. In addition, the failure in operation of the motor 3 can be identified from the fact that the contact opening and closing states of the limit switches LSF, LRL on the slider side do not change even after a lapse of a predetermined time period.

In a case where the limit switches LRF, LRL on the rod side remain in a state in which a parking lock effected position is detected (LRF: off; LRL: on) with the motor 3 being out of operation when the selector switch 34 is set at the positions other than the position P, it can be assumed that the rod 8 is jammed on the side where parking lock is effected.

If the limit switches LRF, LRL on the rod side remain in a state in which a parking lock release position is detected (LRF: on, LRL: off) with the motor 3 being out of operation when the selector switch 34 is set at the position P, it can be assumed that rod 8 is jammed on the side where parking lock is released.

A failure to return the manual lock release lever 27 to an original position can be identified from the fact that although the limit switches LSF, LSL on the slider side are put in a state in which a parking lock effected position is detected (LSF: off, LSL: on) from astate inwhichboththe limit switches are off, the limit switches on the rod side remain in the state in which a parking lock release position is detected (LRF: on, LRL: off).

Thus, it can be judged that there happens a certain abnormal event if the contact opening and closing states of the limit switches LRF, LRL on the rod side and the limit switches LSF, LSL on the slider side are different from each other. Accordingly, if such a state is detected, the warning lamp is illuminated to warn the driver, and a malfunction of the parking lock device can be prevented by stopping the motor 3.

When the selector switch 34 is set at any of the positions other than the position P, the failure to return the manual lock release lever 27 to the original position cannot be judged from the opening and closing state of the respective limit switches LRF, LRL, LSF, LSL, but with the selector switch 34 being set at any of the positions other than the position P, the parking lock release state is judged as normal, and therefore there is caused no actual harm.

Thus, although items are raised that can be judged from the contact conditions of the limit switches LRF, LRL, LSF, LSL, more accurate failure judgement can be effected by judging an operating condition from the revolution speed or current value of the motor 3, considering additionally the contact states of the limit switches, and integrating them into a matrix.

The detection of the movement limits on the slider side can be effected by detecting the current value or revolution speed of the motor 3, but such a control is based on a detection of a forced stop of the motor 3 at mechanical movement limits of the slider 6, and therefore the overload durability of the respective portions has to be set larger. Thus, when considering of the durability, the stop control over the limit switches LSF, LSL is more advantageous.

Thus, according to the first aspect of the invention, since an operation for release of parking lock from the drive source such as the motor is effected by substantially directly connecting the drive source side to the parking lock pawl side so that the drive force from the drive source is directly transmitted to the input end of the parking lock pawl such as the rod, while an operation for effecting parking lock is performed by connecting the drive source side to the parking lock pawl via the spring means so that the drive force from the drive source can be transmitted to the parking pawl side through the spring-back force of the spring, even when the drive source is out of operation in the parking lock effected state, only the parking lock pawl side can be moved in a lock release direction by manually pushing and contracting the spring with the manual lock release means irrespective of the state of the drive source side. Therefore, the construction according to the present invention can provide a marked advantage in simplifying the construction of the manual lock release mechanism. In addition, according to the second aspect of the invention, a failure of the actuator for operating the parking lock pawl can securely be signaled to the driver when such actually happens, and moreover, even if a manual lock release operation is erroneously executed, the operating position on the drive source side and the operating position on the parking lock pawl side are separately detected. Consequently, the drive source side can be protected against a failure or a malfunction.

While only certain embodiments of the invention have been specifically described herein, it will apparent that numerous modifications may be made thereto without departing from the spirit and scope of the invention.

The present disclosure relates to the subject matter contained in Japanese patent application No. Hei.10-254969 filed on Sep. 9, 1999 which is expressly incorporated herein by reference in its entirety.

What is claimed is:

1. An electric parking lock device, comprising:

a drive source generating a drive force so that a parking lock pawl engages with and release from a parking lock gear in response to an output from a parking command means;

spring means provided along a force transmission path between an output end of said drive source and an input end of said parking lock pawl, for generating a biasing force directed so as to bring said parking lock pawl into engagement with said parking lock gear, said spring means being maintained without deflecting until said parking lock pawl is at least engaged with said parking lock gear when a force which is directed to bring said parking lock pawl into engagement with said parking lock gear is applied to said parking lock pawl, said spring means being deflectable by a distance equal to a stroke sufficient for at least releasing said parking lock pawl from said parking lock gear when a force which is directed so as to release said parking lock pawl from said parking lock gear is applied to said parking lock pawl; and manual lock release means for applying a force directed to release said parking lock pawl from said parking lock gear at said force transmission path on a side thereof which is closer to said input end of said parking lock pawl than to said spring means.

2. An electric parking lock device as set forth in claim 1, further comprising:

output side member position detection means for detecting an output side member interlockingly connected to the output end of said drive source and a displacement limit positions of said output side member; and input side member position detection means for detecting an input side member interlockingly connected to the input end of said parking lock pawl and both displacement limit positions of said input side member, wherein said drive source is controlled in response to an output from said two position detection means.

3. An electric parking lock device, comprising:

a parking command unit outputting a parking command;

a lock unit locking a rotation of a wheel of a vehicle by bringing a parking lock pawl into engagement with a parking lock gear;

a driving source generating a driving force in response to the parking command from said parking command unit to activate said lock unit;

a spring member provided between an output end of said driving source and an input end of said parking lock pawl so that said output end of said driving source interlocks with said input end of said parking lock pawl via said spring member when said parking lock pawl engages with said parking lock gear; and a manual lock release unit releasing said parking lock pawl from said parking lock gear independent of the driving force from said driving source;

a sliding member linearly slidable by the driving force from said driving source; and a connecting member interlockingly movable with the engagement/release of said parking lock pawl with/from said parking lock gear, wherein said spring member is provided between said sliding member and said connecting member, and said manual lock release unit releases said parking lock pawl from said parking lock gear by moving said connecting member.

4. An electric parking lock device as set forth in claim 3, wherein when said manual lock release unit release said parking pawl from said parking lock gear, while shrinking said spring member by an amount of the movement of said connecting member.

* * * * *